3,124,459
ORGANOLEPTIC COMPOSITIONS
Charles Ward Erwin, 228 N. La Salle St., Chicago, Ill.
No Drawing. Filed Mar. 16, 1961, Ser. No. 96,104
11 Claims. (Cl. 99—1)

This invention relates to compositions and methods for eliminating, reducing or preventing the formation of unpleasant odors generated by mammals, and to food products containing said compositions.

I have found that such unpleasant odors may be eliminated or reduced by ingestion of a composition comprising edible water-soluble ferrous and cupric compounds. Specifically, this composition includes ferrous iron and cupric copper in a ratio which may vary from 1000:1 to 1:10, preferably from 100:1 to 1:1. These ratios refer to the metal contents of the soluble compounds in my composition. Further, for most effective deodorizing effect, the ferrous iron and the copper are both present in two forms; as a water-soluble ionizable salt and as a water-soluble non-ionizable complex, specifically, a chelate. The water-soluble ionizable salts may amount to from 10 to 90% of the total amount of iron and copper compounds, the remainder being the water-soluble non-ionizable copper and iron complexes. My composition also includes from 1 to 10 parts by weight of a soluble edible phosphate for each part by weight of said soluble ferrous iron and organic copper compounds.

Among the ionizable cupric copper and ferrous iron salts that may be used are the sulfates, chlorides and acetates. Among the water-soluble cupric copper and ferrous iron complexes that may be used are the gluconates, citrates, tartrates, the salts of ethylene diamine tetra acetic acid, and the sodium or potassium iron and copper chlorophyllins.

There are various unpleasant body odors generated by mammals. These body odors include what may be called body odors proper which emanate from the skin and the hair and which are often due to perspiration (in those mammals which secrete perspiration); breath odors, which are due, in part, to materials adhering to the teeth, tongue and gums (which odors may be referred to as mouth odors) and, in part, to odors released in the lungs, as on the ingestion of odoriferous materials (such as onions and garlic) which are absorbed through the lining of the gastrointestinal tract and carried in the blood stream to the lungs; fecal and flatulence odors; and urine odors.

Some of these odors are hereinafter referred to as systemic odors. With this term I designate odors due to odoriferous substances carried in the blood stream. These systemic odors appear in the body odor, particularly in the body odors of animals secreting perspiration; in the urine odor; and in the breath odor, in particular that part of the breath odor which may be referred to as lung odor, since it originates in the lung.

As noted hereinabove, these systemic odors are due to odoriferous substances carried in the blood stream. These odoriferous substances, as noted hereinabove, may be ingested with food and thus introduced into the blood stream. Other odoriferous substances, e.g., indole and skatole, are generated in the lower intestine by putrefaction of proteins and, by absorption through the intestinal wall, introduced into the blood stream.

Other body odors are herein referred to as local body odors. These include the above-noted mouth odors due to putrefaction of food material lodged on the teeth, tongue and gums and also fecal and flatulence odors due to putrefactive decomposition of proteins in the lower intestine.

My above-disclosed deodorant composition when incorporated with a food which is ingested by a mammal, eliminates, prevents or reduces both systemic and local body odors.

This food composition of the present invention includes from 1 to 100 parts per million of ferrous iron and from 0.1 to 10 (preferably 5 or 6 or 7) parts per million of cupric copper. Preferably, the ratio of iron to copper is from 1:1 to 50:1 or 100:1. I have found that there is a synergistic effect between ferrous iron and cupric copper in these ratios, with respect to elimination, prevention and reduction of body odors.

Further, I include with my food composition from one to ten parts by weight, for each part by weight of water-soluble iron and copper compound, of an idible water-soluble phosphate, such as mono-, di-, or trisodium phosphate, or a sodium salt of a polyphosphoric acid, for instance, disodium dihydrogen pyrophosphate, sodium tripolyphosphate, tetrasodium pyrophosphate, sodium hexametaphosphate, the corresponding potassium and ammonium phosphates, and the like.

The nature of the above-noted body odor inhibition is illustrated by the following experiment.

Seventeen groups of three mice each were kept in separate cages and fed Rockland small animal food, ground, for one week. The cages were provided with fine screen floors so that the feces could not drop through the floor. A circle of filter paper was kept in a pan below the floor of each cage. The feces were removed each day and the paper circles were changed each day. After one week, the odor of the mice, the feces and the paper circles which trapped the urine was measured as follows:

The odor of the whole mouse was measured by placing each individual mouse in a plastic bag for three minutes at room temperature. The odor in the bag was then evaluated with an osmoscope graduated to distinguish six odor levels indicated as 1, 2, 3, 4, 5 and 6, in order of ascending odor levels.

The fecal odor was determined by placing twenty-five feces pellets in a large test tube which was capped and allowed to stand in an incubator at 37° C., for five minutes. The odor level was then determined with an osmoscope.

The urine odor was determined by removing the circle of paper from the pan below the cage and placed in a plastic bag which was closed and placed in the incubator for five minutes. The odor level was then determined with an osmoscope.

The groups of mice were then fed with a diet of ground Rockland food supplemented as indicated in the following table:

| Group | Supplement per pound of food | Mg. |
|---|---|---|
| 1 | Disodium dihydrogen pyrophosphate | 100 |
| 2 | Disodium dihydrogen pyrophosphate | 100 |
|   | Ferrous ammonium sulfate | 20 |
| 3 | Disodium dihydrogen pyrophosphate | 100 |
|   | Copper sulfate | 1.1 |
| 4 | Disodium dihydrogen pyrophosphate | 100 |
|   | Ferrous gluconate | 24.1 |
| 5 | Disodium dihydrogen pyrophosphate | 100 |
|   | Copper gluconate | 2.0 |
| 6 | Disodium dihydrogen pyrophosphate | 100 |
|   | Ferrous ammonium sulfate | 20 |
|   | Copper sulfate | 1.1 |
| 7 | Disodium dihydrogen pyrophosphate | 100 |
|   | Ferrous gluconate | 24.1 |
|   | Copper gluconate | 2.0 |
| 8 | Disodium dihydrogen pyrophosphate | 100 |
|   | Ferrous ammonium sulfate | 10 |
|   | Copper sulfate | 0.55 |
|   | Ferrous gluconate | 12.05 |
|   | Copper gluconate | 1.0 |
| 9 | Ferrous ammonium sulfate | 10 |
|   | Copper sulfate | 0.55 |
|   | Ferrous gluconate | 12.05 |
|   | Copper gluconate | 1.0 |

| Group | Supplement per pound of food | Mg. |
|---|---|---|
| 10 | No supplement | |
| 11 | Sodium tripolyphosphate | 100 |
| | Ferrous gluconate | 12.05 |
| | Ferrous ammonium sulfate | 10 |
| | Copper sulfate | 0.55 |
| | Copper gluconate | 1.0 |
| 12 | Tetrasodium pyrophosphate | 100 |
| | Ferrous gluconate | 12.05 |
| | Ferrous ammonium sulfate | 10 |
| | Copper sulfate | 0.55 |
| | Copper gluconate | 1.0 |
| 13 | Sodium hexametaphosphate | 100 |
| | Ferrous gluconate | 12.05 |
| | Ferrous ammonium sulfate | 10 |
| | Copper sulfate | 0.55 |
| | Copper gluconate | 1.0 |
| 14 | Monosodium orthophosphate | 100 |
| | Ferrous gluconate | 12.05 |
| | Ferrous ammonium sulfate | 10 |
| | Copper sulfate | 0.55 |
| | Copper gluconate | 1.0 |
| 15 | Disodium orthophosphate | 100 |
| | Ferrous gluconate | 12.05 |
| | Ferrous ammonium sulfate | 10 |
| | Copper sulfate | 0.55 |
| | Copper gluconate | 1.0 |
| 16 | Ferrous gluconate | 12.05 |
| | Ferrous ammonium sulfate | 10 |
| | Copper sulfate | 0.55 |
| | Copper gluconate | 1.0 |
| 17 | Trisodium orthophosphate | 100 |
| | Ferrous gluconate | 12.05 |
| | Ferrous ammonium sulfate | 10 |
| | Copper sulfate | 0.55 |
| | Copper gluconate | 1.0 |

After five days of supplemented diet, the odor levels of the mice were again determined, and the same was done after another week on the supplemented diet. The original odor levels, those after five days, and those after a further week (indicated as 1, 2 and 3), are shown in the following table. The numbers tabulated are the average of the three mice in each group.

*Odor Levels*

| Group | Total Mouse | | | Fecal | | | Urine | | |
|---|---|---|---|---|---|---|---|---|---|
| | 1 | 2 | 3 | 1 | 2 | 3 | 1 | 2 | 3 |
| 1 | 6 | 6 | 6 | 6 | 6 | 6 | 6 | 6 | 6 |
| 2 | 6 | 6 | 6 | 6 | 6 | 6 | 6 | 6 | 6 |
| 3 | 6 | 6 | 5 | 6 | 5 | 4 | 6 | 6 | 5 |
| 4 | 6 | 6 | 6 | 6 | 6 | 6 | 6 | 6 | 6 |
| 5 | 6 | 5 | 4 | 6 | 5 | 5 | 6 | 4 | 4 |
| 6 | 6 | 4 | 4 | 6 | 3 | 1 | 6 | 4 | 4 |
| 7 | 6 | 4 | 3 | 6 | 5 | 4 | 6 | 2 | 1 |
| 8 | 6 | 1 | 1 | 6 | 1 | 1 | 6 | 1 | 1 |
| 9 | 6 | 3 | 3 | 6 | 4 | 4 | 6 | 1 | 1 |
| 10 | 6 | 6 | 6 | 6 | 6 | 6 | 6 | 6 | 6 |
| 11 | 6 | 2 | 1 | 6 | 2 | 2 | 6 | 1 | 1 |
| 12 | 6 | 1 | 1 | 6 | 1 | 1 | 6 | 1 | 1 |
| 13 | 6 | 1 | 1 | 6 | 1 | 1 | 6 | 1 | 1 |
| 14 | 6 | 1 | 1 | 6 | 1 | 1 | 6 | 1 | 1 |
| 15 | 6 | 2 | 1 | 6 | 2 | 2 | 6 | 2 | 1 |
| 16 | 6 | 4 | 3 | 6 | 4 | 4 | 6 | 2 | 1 |
| 17 | 6 | 4 | 4 | 6 | 5 | 4 | 6 | 4 | 3 |

The Rockland rat or small animal food mentioned above is a standard food containing soybean oil, meal, cane molasses, fish meal, condensed buttermilk, corn gluten meal, irradiated brewers' type yeast, 4 oz. per ton wheat germ oil, o.p. linseed oil meal, corn oil meal, ground oats, wheat bran, wheat flour midds, ground yellow corn, ground hulled barley, ground hulled oats, ground whole wheat, whole milk powder, alfalfa leaf meal, vitamin A oil, ½% steamed bone meal, 1% calcium carbonate from limestone, and 2% salt. This food contains at least 21% crude protein, at least 4% crude fat, not more than 6% crude fiber, and 5,000 U.S.P. units vitamin A per pound.

Attention is directed to the complete all around odor inhibition in groups 8 and 11 through 15 which were fed with both ionizable and non-ionizable ferrous iron and cupric copper compounds combined with various sodium phosphates.

Group 17 (trisodium orthophosphate) has been included to show the effect of this specific phosphate. While not as effective as the other phosphates in urine deodorization, it does not significantly interfere with total deodorization and with fecal deodorization, as compared with the metal compounds used without any phosphates. As will be disclosed hereinbelow, there are other advantages connected with the use of soluble phosphates (including trisodium orthophosphate) which provide reasons for including them with my deodorizing compositions even when, as in the case of trisodium orthophosphate, the deodorizing effect is not enhanced thereby.

The combination of groups 8 and 11 through 15 has been tested, with excellent results, on dogs, cats and humans. For humans, the supplement was mixed with oat meal; for cats, with fish which was thereafter canned; and for dogs, with horse meat, which was thereafter canned.

The deodorizing food supplement of the present invention, when added to smelly goods, for instance, canned fish, or canned horse meat flavored with garlic, greatly reduces the smell of such food.

Ferrous and cupric gluconates, and other soluble chelates of these metals, and also water soluble ionizable ferrous and cupric salts, when admixed with foods in the amounts indicated as being within the scope of the present invention, may confer on these foods a metallic, astringent aftertaste. However, no such aftertaste can be noted when the above indicated amounts of edible soluble phosphates are also included with the foods.

Compositions 2 to 9, 11 to 15 and 17 tabulated hereinabove do not have a metallic astringent taste or aftertaste, whether tasted as dry powders or as dilute water solutions.

Sugar may be included with my deodorizing compositions in amounts ranging from the total weight of the other ingredients up to 10, 20 or 100 or more times the said weight, to cancel the sour taste of some soluble phosphates.

Thus, the phosphate containing deodorizing compositions of my present invention may be added to foods of various kinds (including chewing gum or candy) and to pharmaceutical products without adversely affecting the taste of the food or the pharmaceutical product. The compositions may even be dissolved in water as very dilute solutions (1 to 5 parts per million metallic copper content) for use as a deodorizing mouth wash.

I claim:

1. A food composition containing water-soluble compounds of ferrous iron and cupric copper in a ratio of from about 1000:1 to about 1:10 of metallic iron content to metallic copper content, a part of each of said metals being present in the form of an edible water-soluble ionizable salt, the remainder of each being present in the form of an edible water-soluble non-ionizable chelate, said metals in the form of salt making up from about 10 to about 90 percent of the total amount of said metals, said composition further comprising an edible water-soluble phosphate in an amount ranging from about 1 to about 10 parts by weight for each part by weight of said ionizable and non-ionizable compounds, the total added copper content of said food composition being from 0.1 to less than 10 parts per million.

2. A composition according to claim 1 containing said metals in a ratio of iron to copper ranging from about 5:1 to about 100:1.

3. A composition according to claim 1 in which said phosphate is a sodium orthophosphate.

4. A composition according to claim 1 in which said phosphate is a sodium polyphosphate.

5. A composition accordingly to claim 1 in which said phosphate is a sodium pyrophosphate.

6. A deodorizing composition comprising water-soluble compounds of ferrous iron and cupric copper in a ratio of from about 1000:1 to about 1:10 of metallic iron content to metallic copper content, from about 10 to about 90% of each of said compounds being ionizable and the remainder of each of said compounds being non-ionizable chelates, said composition additionally comprising a water-soluble phosphate in an amount ranging from about 1 to about 10 parts by weight of each parts by weight of said compounds.

7. A composition according to claim 6 in which said non-ionizable compounds are gluconates.

8. A composition of matter according to claim 6 additionally comprising sugar in an amount at least equal to the total weight of the iron, copper and phosphate ingredients of the composition.

9. A composition according to claim 6 in which said non-ionizable iron compound is ferrous gluconate and said phosphate is a pyrophosphate.

10. A method of treating food material to confer deodorizing properties on said food, said method comprising incorporating with said material a composition comprising ferrous iron and cupric copper in a ratio ranging from about 100:1 to about 1:1, said metals being present in said composition in the form of water-soluble compounds, from about 10 to about 90 percent of each of said compounds being ionizable and the remainder of each being non-ionizable chelates, said composition additionally comprising a soluble phosphate in an amount ranging from about 1 to about 10 parts by weight for each part by weight of said water-soluble compounds, said composition being incorporated in an amount such as to add less than 10 parts per million of copper to said food.

11. A method of treating foods and pharmaceutical products containing from 1 to 100 parts per million of water soluble ferrous iron compounds and from 0.1 to 10 parts per million of water soluble copper compounds, each in the ionizable form and non-ionizable chelate form, for the purpose of eliminating a metallic, astringent taste due to said compounds, said method comprising incorporating with said foods and pharmaceutical products a soluble phosphate in an amount ranging from about 1 to about 10 parts by weight for each part by weight of said compounds.

References Cited in the file of this patent
UNITED STATES PATENTS

| | | |
|---|---|---|
| 2,791,590 | Rapp | May 7, 1957 |
| 2,895,830 | Roe | July 21, 1959 |
| 2,926,085 | Geerlings | Feb. 23, 1960 |
| 2,960,406 | Cardon | Nov. 15, 1960 |

OTHER REFERENCES

Eddy: Chlorophyll, 1953, American Chlorophyll Division, Strong, Cobb & Co., Inc., Lake Worth, Florida, pages 34, 38, 41 and 45.

Chem. Abst. 46 (1952), 9268a. (Copy in Scientific Library.)